March 24, 1931.  B. F. McCAIN ET AL  1,797,476
AGRICULTURAL MACHINE
Filed June 14, 1930   4 Sheets-Sheet 1
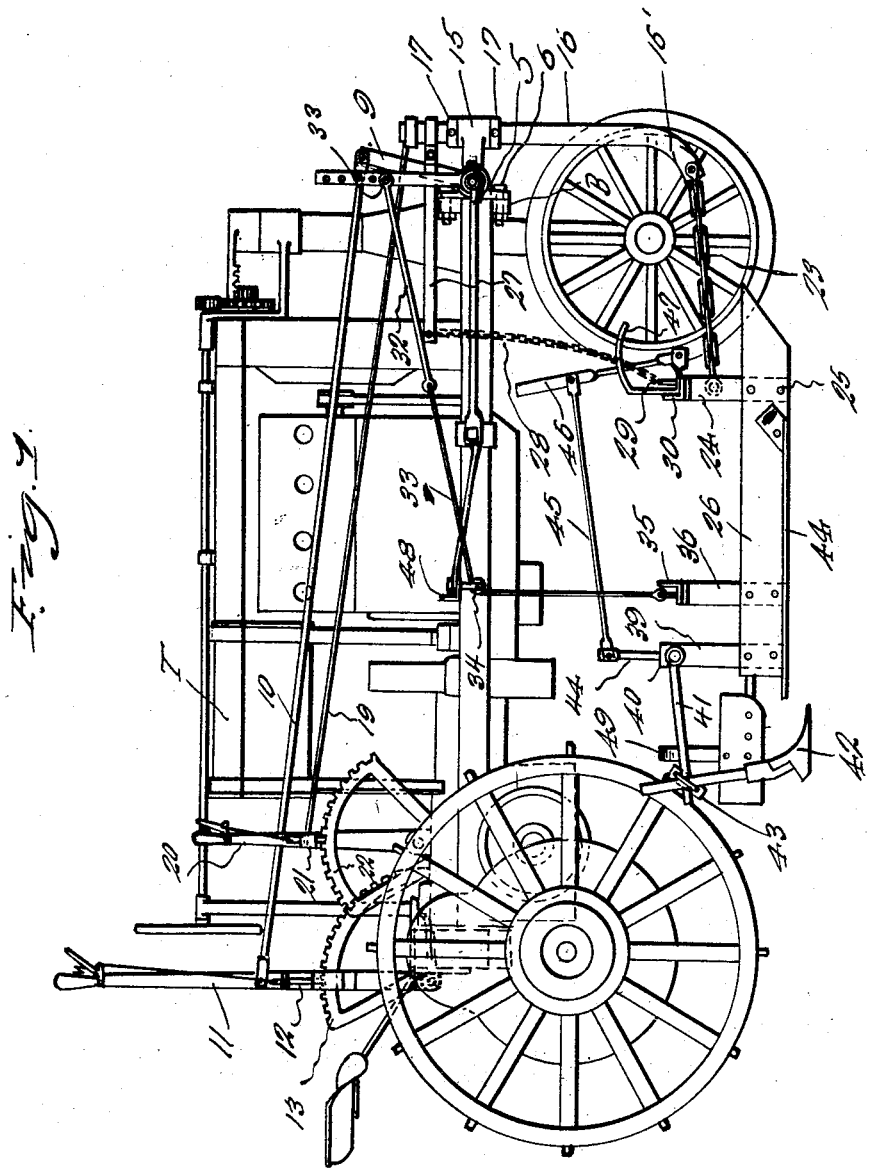
Inventor
B. F. McCain
H. C. McCain
By Clarence A. O'Brien
Attorney

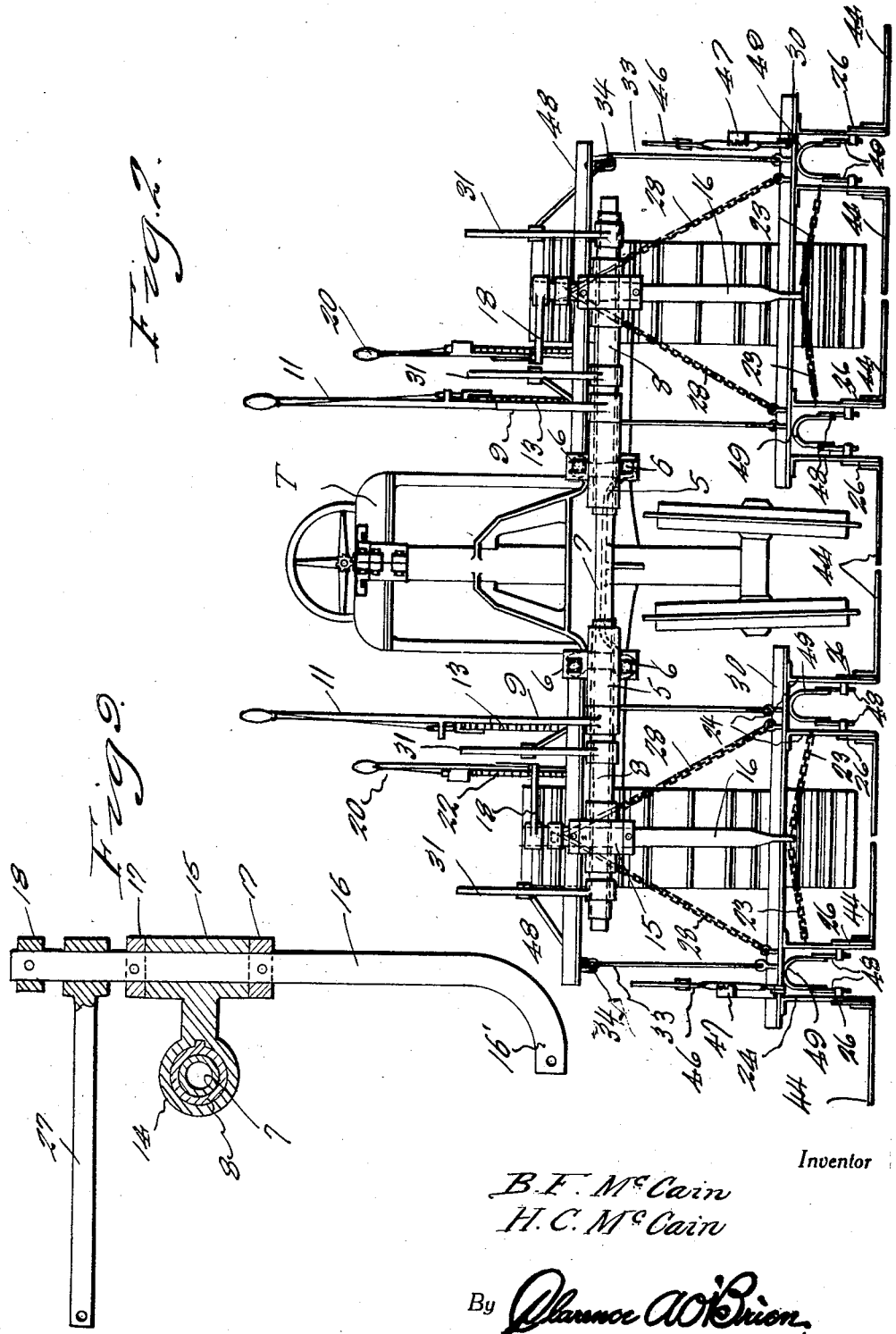

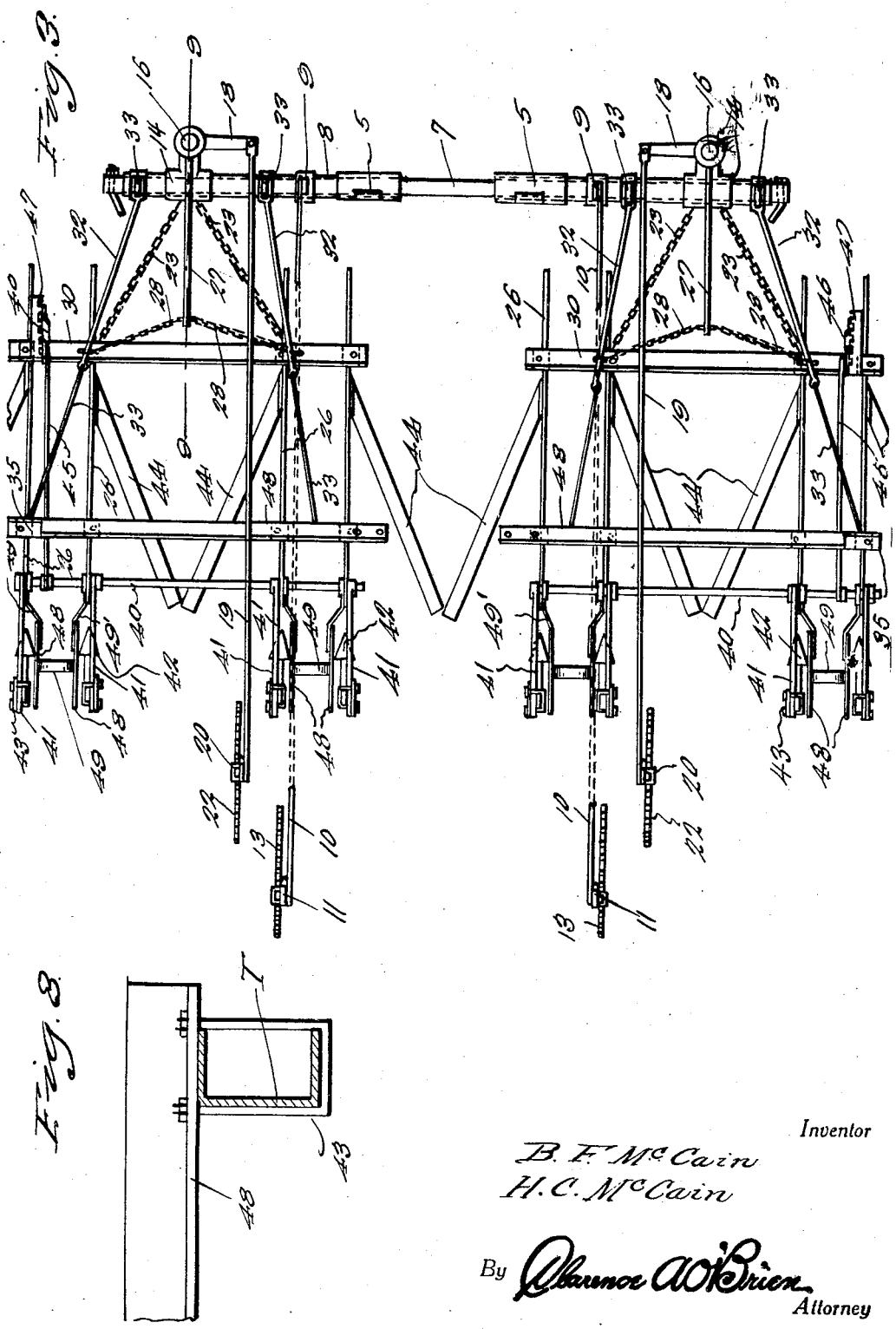

March 24, 1931.  B. F. McCAIN ET AL  1,797,476
AGRICULTURAL MACHINE
Filed June 14, 1930   4 Sheets-Sheet 4
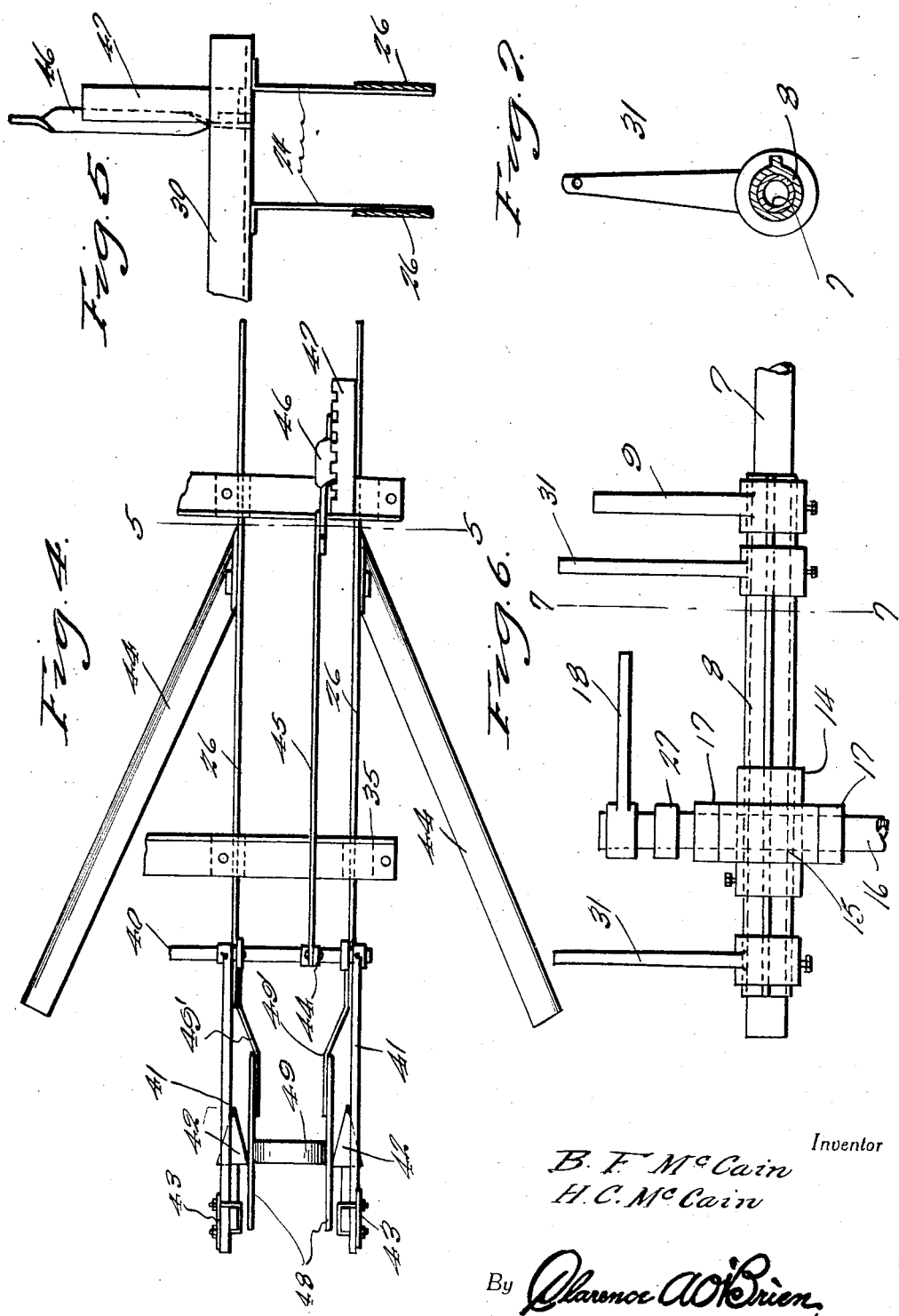
Inventor
B. F. McCain
H. C. McCain
By Clarence A. O'Brien
Attorney Patented Mar. 24, 1931

1,797,476

UNITED STATES PATENT OFFICE

BENJAMIN F. McCAIN AND HENRY C. McCAIN, OF PADUCAH, TEXAS

AGRICULTURAL MACHINE

Application filed June 14, 1930. Serial No. 461,157.

This invention relates to certain new and useful improvements in agricultural machines, and has more particular reference to that type of agricultural machines known in the art as a "go-devil".

A primary object of the invention is to provide an attachment in the nature of a go-devil to be mounted on the forward end portion of a tractor.

A still further object of the invention is to provide means for mounting two of such go-devils on the forward end of the tractor, one adjacent each side of the tractor, together with means for regulating the depth of the earth working elements, forming a part of the agricultural devices, or so called "go-devils".

Other objects and advantages of the invention will become apparent during a study of the following description, taken in connection with the accompanying drawings wherein:—

Figure 1 is a side elevational view of a tractor having the invention associated therewith.

Fig. 2 is a front elevational view thereof.

Fig. 3 is a top plan view of the attachment per se.

Fig. 4 is a fragmentary detail plan view of a portion of one of the go-devils for agricultural devices forming part of the attachment.

Fig. 5 is a detail sectional view taken substantially on the line 5—5 of Fig. 4.

Fig. 6 is a fragmentary detail view illustrating the manner of securing the lever to the sleeve of the stationary shaft.

Fig. 7 is a fragmentary detail sectional view, taken substantially on the line 7—7 of Fig. 6.

Fig. 8 is a fragmentary detail view partly in section and partly in elevation showing the manner of securing one of the plows to the arm of the plow shaft.

Fig. 9 is a detail sectional view taken substantially on the line 9—9 of Fig. 3.

With reference more in detail to the drawings, it will be seen that I have designated a conventional type of tractor by the reference T, the same being provided at the forward end thereof with a pair of spaced bracket members B.

As comprehended by the present invention, there is suitably secured to each of the brackets B a bearing bracket 5 by suitable bolt means, designated at 6. Supported in the bearing brackets 5, and extending transversely of the tractor, is a non-rotatable shaft 7.

Rotatable on the shaft 7 at each end thereof, is an elongated sleeve 8. One end of each sleeve extends through an adjacent one of the bearing brackets 5. Suitably keyed to each sleeve 8 for rotation therewith, is a crank arm 9 which has a link connection 10 with a pivotally mounted lever 11, suitably supported at the rear of the tractor, within convenient reach of the driver of the tractor.

The control lever 11 is provided with a suitable detent structure 12 for cooperation with a rack segment 13, suitably secured to the tractor T.

Also keyed to each of the sleeves 8 is a bearing bracket 14 which includes a forwardly extending arm merging into a vertical bearing 15. A draw beam 16 has its upper end rotatable in the bearing 15 and is suitably retained in position through the medium of upper and lower collars 17.

The draw beam 16 on the upper end thereof, has an arm 18 extending laterally therefrom. The arm 18 has a link connection 19 with a control lever 20 also pivotally mounted on the tractor T in proximity to the lever 11. The lever 20 is provided with a suitable detent structure 21 for cooperation with the rack segment 22, rigidly secured to the tractor T.

Each of the draw beams 16 at its lower end, is curved as at 16'. The curved lower ends 16' of the beams have chains 23 secured thereto. The chains 23 have their free ends secured to brackets 24 which support on their lower ends the forward ends of guard members 26.

The forward ends of the guard members 26 are secured to the lower ends of the brackets 24 as at 25.

Each of the beams 16 adjacent its upper end is provided with a rearwardly extending arm 27 from the free end of which extends a chain 28. The chains 28 at their lower ends are secured one to each end of a cross bar 30 which connects the upper ends of the brackets 24, of a pair of guard members 26.

The said lower ends of each chain 28 is secured to its cross bar 30 through the medium of suitable eye bolts 29. Also keyed to each of the sleeves 8 is a pair of arms 31, the arms of each pair being disposed one to each side of a bearing bracket 14. The arms of each pair of arms have each an adjustable pivotal connection 33 with a link 32. For each link 32 there is provided a cable 33 which is secured at one end to the free end of its links 32, and the cables 33 of each pair are trained over pulleys 34 and at their free ends are secured one to each end of a cross bar 35, connecting the upper ends of a pair of brackets 36.

The brackets 36 are secured at their lower ends to the guards 26. Brackets 39 rise from the rear end of the guards 26, and in the upper ends of the brackets 39 of each go-devil is supported a plow shaft 40. Each of the plow shafts 40 has a plurality of arms 41 extending therefrom. The arms 41 are arranged in pairs corresponding to the pairs of guards 26, and each of the arms 21 support from their free ends, an earth working member, which in the present instance, is in the nature of a plow 42.

The shanks of the plows are suitably clamped to the free ends of the crank arms 41 by U-bolts 43. In this connection it will be noted that each of the plow shafts 40 have two of such pairs of arms 41 so that there is a pair of earth working implements for each row to be worked. Obviously, therefore, as comprehended by the present invention, four rows may be worked simultaneously.

A blade for working between the rows of crops is carried by each of the guards 26. The blades are designated by the reference characters 44. In this connection, it will be seen that there is one blade for each guard 26. The said blades 44 are secured at their forward ends slightly rearwardly of the forward ends of the guards 26 and extends rearwardly and at somewhat of an obtuse angle from the guard 26. It will also be noted that the blades 44 extend parallel to the ground, and that said blades 44 are arranged in pairs, the blades of the respective pairs extending rearwardly and at their free ends converging towards one another.

For each pair of plows 42 there is arranged rearwardly of each pair of guard members 26, a pair of guards 48, the pairs of guards 48 being arranged between the plows 42 of the respective pairs of plows. Suitable bracket arms 49' extend rearwardly from the guards 26 and are suitably secured to the guards 48 for retaining the guards 48 in position. The guards of each pair are secured suitably together by a U-shaped spacer member 49.

For moving the plows 42 relative to the guards 26 for controlling the digging depth of the plows 42, each of the plow shafts 40 is provided with a crank arm 44 having a link connection 45 with a lever 46 pivoted to the lower end portion of an angular bracket 47. The bracket 47 has formed integrally therewith a rack bar 47', and the lever 46 is provided with a suitable detent structure for engaging the teeth of the rack bar 47'.

From the foregoing then it will be seen that each go-devil embodies the same features of construction, and that the go-devils may be operated independently of each other.

In the operation of the device, as is thought apparent from the foregoing description taken in connection with the accompanying drawings, the operator by rocking the lever 11 will rotate the walking beam so that the guard members 26 and their associate parts including the plows 42 may be swung on a horizontal plane to the position at any desired angle.

As is also apparent, the operator may exert a rearward pull on lever 20 for rocking plow beam 26 in one direction so that the lower end thereof swings upwardly and forwardly, and causing arm 27 to swing downwardly and rearwardly. Arms 31 will also swing rearwardly so that the forward ends of guards 26 will be raised, and the plows 42 will be moved downwardly into ground engaging position.

On the other hand, by rocking the lever forwardly, the plow beam 16, arm 27 and arm 31 will swing in an opposite direction so that the rearward ends of the guards 26 will be raised as will also the plows 42 when the forward ends of the guards 26 are lowered. It will be apparent that the plows 42 may be regulated relative to the ground by the operator. Furthermore, as before intimated, the plow 42 may be also regulated relative to the guard 26 through the rocking of the lever 46.

From the foregoing it will be seen that I have provided a thoroughly efficient and practical go-devil attachment for tractors, and that such attachment may be readily associated with any desired type of tractor.

Even though I have herein shown and described the preferred embodiment of my invention, it is to be understood that the same is susceptible to changes fully comprehended by the spirit of the invention, and the scope of the appended claims.

Having thus described my invention, what I claim as new is:—

1. In an attachment for tractors, a shaft adapted to be secured transversely of the tractor at the forward end thereof, a sleeve rotatable on said shaft, a bearing bracket carried by said sleeve, a draw beam rotatably supported in said bearing bracket and having its lower end offset, ground working mechanism adapted to be arranged rearwardly of said draw beam, flexible means connecting the lower end of said draw beam with the forward end portion of said ground working mechanism, additional means carried by said sleeve for supporting the rear end portion of said earth working mechanism, means for rotating said draw beam for positioning said earth working mechanism at any predetermined angle, and means for rocking said sleeve for controlling the depth of said earth working mechanism.

2. In an attachment for tractors, a plurality of longitudinally spaced guard members, said guard members being arranged in pairs, brackets rising from the forward ends of said guard members, a cross bar connecting the upper ends of said brackets, a shaft adapted to be mounted on said tractor, rockable members mounted on said shafts, flexible means connecting said rockable members with said brackets and cross bar respectively, brackets rising from said guards inwardly from the rear end of said guards, a cross bar connecting the upper ends of the last-mentioned brackets, means carried by said shaft and engaging the last-mentioned cross bar for yieldably supporting the rear portion of said guards, earth working blades carried by each of said guard members, and extending substantially parallel to the ground, said blades extending rearwardly of the tractor and at an angle to said guards.

3. In an attachment for tractors, two earth working implements disposed respectively at the side of said tractor, each of said implements comprising a pair of relatively spaced guard members, a blade mounted on each of said guard members, a bracket rising from each of said guard members adjacent one end thereof, a cross bar connecting said bracket, a second bracket rising from each of said guard members, a cross bar connecting the second brackets, a rotatable element, means for rotatably mounting said element adjacent the forward end of the tractor, a bearing mounted on said rotatable element, a draw beam journalled in said bearing for rotation relative thereto, said draw beam having its lower end offset, flexible members connecting the offset end of said draw beam with the first mentioned brackets, an arm on the upper end of the draw beam for rotation therewith, flexible elements connecting said arm with the first mentioned cross bar, and flexible means operatively connecting said rotatable member with the second mentioned cross bar for supporting the rear ends of said guards, and means for securing said rotatable member in a fixed desired adjustment.

4. An attachment for tractors comprising in combination an earth working element including a pair of spaced apart guard members, flexible means for suspending said guard members from the tractor, means for swinging said guard members on a plane substantially parallel to the ground, additional means for swinging said guard members on a plane substantially perpendicular to the ground, an earth working implement disposed rearwardly of each of said guard members, means operatively connecting said last mentioned earth working implements with said guards, and means for swinging said last mentioned earth working implements relative to said guards.

5. An attachment for tractors comprising two implements disposed respectively at the sides of said tractor, each of said implements comprising oppositely disposed pairs of parallel guard members, cross bars connecting said guard members, a rotatable sleeve, means for rotatably mounting said sleeve on the tractor, arms engageable with said sleeve and rotatable therewith, flexible elements connecting said arms with one of said cross bars, a bearing mounted on said sleeve for rotation therewith, a draw beam journalled in said bearing for rotation relative thereto, an arm mounted on said beam for rotation therewith, flexible elements connecting said arm with the other of said cross bars, additional flexible elements connecting said implement with said draw beam, and means for securing said sleeve at any desired fixed point of rotative adjustment.

6. An attachment for tractors comprising two implements disposed respectively at the sides of said tractor, each of said implements comprising oppositely disposed pairs of parallel guard members, cross bars connecting said guard members, a rotatable sleeve, means for rotatably mounting said sleeve on the tractor, arms engageable with said sleeve and rotatable therewith, flexible elements connecting said arms with one of said cross bars, a bearing mounted on said sleeve for rotation therewith, a draw beam journalled in said bearing for rotation relative thereto, an arm mounted on said beam for rotation therewith, flexible elements connecting said arm with the other of said cross bars, additional flexible elements connecting said implement with said draw beam, and means for securing said sleeve at any desired fixed point of rotative adjustment, brackets rising from said guard members, a rock shaft supported by said bracket, rocker arms on said rock shaft, plows on the free ends of said crank arms, and means for rocking said rock shaft for controlling the digging depth of said plows.

In testimony whereof we affix our signatures.

BENJAMIN F. McCAIN.
HENRY C. McCAIN.